United States Patent [19]

Kotabe et al.

[11] Patent Number: 5,194,879
[45] Date of Patent: Mar. 16, 1993

[54] IMAGE FORMING APPARATUS CAPABLE OF CHANGING DOTTING DENSITY

[75] Inventors: Hiroaki Kotabe, Funabashi; Shigeru Yamazaki; Kouji Yamanobe, both of Tokyo; Masaru Kaneko, Yokohama; Yasushi Nakazato, Tokyo; Masahiko Banno; Shinichiro Wada, both of Yokohama; Akihiko Motegi, Kawasaki; Kazuya Iwasaki, Tokorozawa; Takashi Nishizawa, Yokohama, all of Japan

[73] Assignee: Ricoh Company, Ltd., Tokyo, Japan

[21] Appl. No.: 658,780

[22] Filed: Feb. 21, 1991

[30] Foreign Application Priority Data

Feb. 23, 1990 [JP] Japan ..................... 2-40987

[51] Int. Cl.⁵ ............................................. G01D 9/42
[52] U.S. Cl. ..................................... 346/108; 346/160; 358/298; 358/300
[58] Field of Search ................... 346/108, 160, 107 R, 346/76 L; 358/298, 300, 296, 302; 355/233

[56] References Cited

U.S. PATENT DOCUMENTS

| | | | |
|---|---|---|---|
| 4,059,833 | 11/1977 | Kitamura et al. | 346/108 |
| 4,513,300 | 4/1985 | Tatsuno et al. | 346/160 |
| 4,748,455 | 5/1988 | Mori | 346/76 |
| 4,754,291 | 6/1988 | Horikawa | 346/108 |
| 4,893,136 | 1/1990 | Curry | 346/108 |
| 4,899,348 | 2/1990 | Kiya et al. | 372/38 |
| 4,905,022 | 2/1990 | Nagasana | 346/108 |
| 4,963,989 | 10/1990 | Morton | 358/298 |
| 4,978,976 | 12/1990 | Okino | 346/108 |
| 4,992,804 | 2/1991 | Roe | 346/108 |
| 5,001,567 | 3/1991 | Atobe | 358/300 |
| 5,014,138 | 5/1991 | Fischer et al. | 358/298 X |
| 5,059,987 | 10/1991 | Takeyama et al. | 346/108 |

Primary Examiner—A. T. Grimley
Assistant Examiner—T. A. Dang
Attorney, Agent, or Firm—Cooper & Dunham

[57] ABSTRACT

An image forming apparatus includes a laser beam scanning unit for scanning a recording medium in synchronism with a writing clock signal so that a dotted image is formed on the recording medium, a counter for carrying out a count operation in synchronism with the writing clock signal so that one count value or a plurality of count values determining a scanning area is/are obtained, a first controller for activating or inactivating the laser beam scanning unit based on one or the plurality of count values, a dip switch unit for specifying a dotting density, a second controller for controlling the frequency of the writing clock signal and/or a speed of scanning; and a changing unit for changing one or the plurality of count values, which should be obtained by the counter, based on the dotting density specified by the dip switch unit, so that the position of the scanning area with respect to the recording medium is constant even if the frequency of the writing clock signal and/or the scanning speed are changed by the second controller.

15 Claims, 10 Drawing Sheets

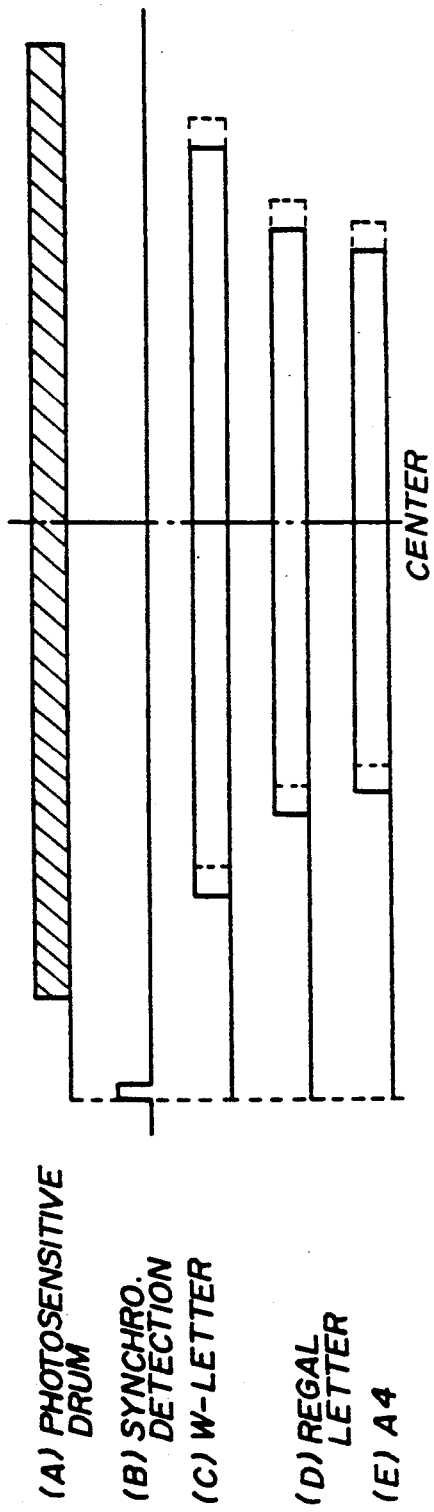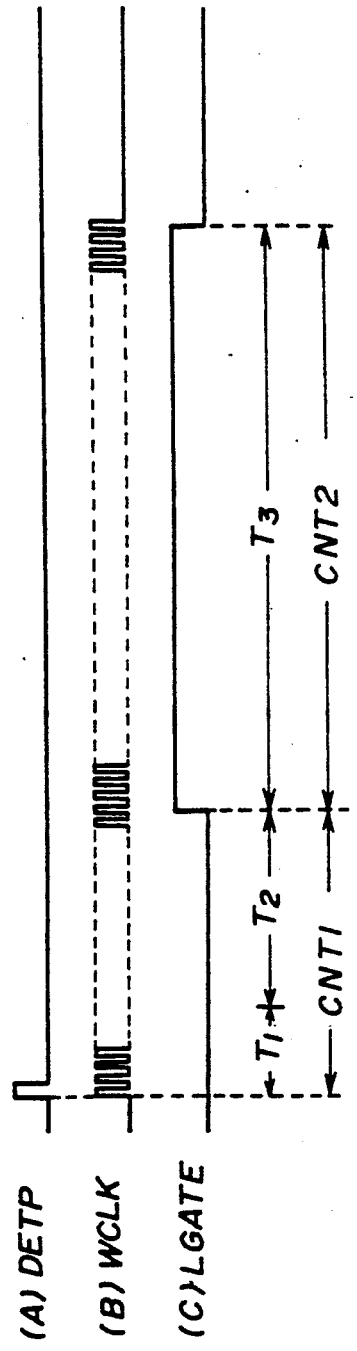

IMAGE FORMING APPARATUS CAPABLE OF CHANGING DOTTING DENSITY

BACKGROUND OF THE INVENTION

The present invention generally relates to a scanning type image forming apparatus capable of changing a dotting density, and particularly to a scanning type image forming apparatus capable of changing a dotting density which is used as an outputting unit of office automation machines such as personal computers, engineering workstations (EWS), word processing machines, digital copy machines and high-speed facsimile machines.

The scanning type image forming apparatus, such as a laser beam printer, has a scanning unit in which a light beam (laser beam) modulated on the basis of image data scans an image forming medium such as a photosensitive material. For example, in the laser beam printer, the laser beam is modulated on the basis of the image data and in synchronism with a writing clock signal supplied from a controller. One clock (one cycle) of the writing clock signal corresponds to one pixel in the image. The laser beam printer described above can rapidly form an image having a high resolution.

In addition, in the laser beam printer, it is possible to easily change a dot size in the image, each pitch between dots and each pitch between scanning lines. That is, a dotting density can be changed. The dotting density is defined as the number of pixels (dots) per unit length in the image which should be formed. Thus, the laser beam printer having a function for selecting a dotting density from a plurality of dotting densities has been proposed.

Prior art related to the changing of the dotting density has been disclosed in Japanese Laid Open Patent Application Nos. 59-117372, 60-120658, 60-93873 and so on.

In the image forming apparatus disclosed in Japanese Laid Open Patent Application No. 59-117372, the dot size and the writing clock signal are controlled on the basis of the pitch between dots and the number of pixels (dots) in one image unit such as one character so that the dotting density is controlled. In the image forming apparatus disclosed in Japanese Laid Open Patent Application No. 60-120658, the intensity of the laser beam and the scanning speed are respectively controlled on the basis of a magnification of the image which should be formed so that the dotting density is controlled. In the image forming apparatus disclosed in Japanese Laid Open Patent Application No. 60-93873, a plurality of optical systems which have different resolutions (corresponding to the dotting densities) are prepared. When one of the optical systems is mounted in the image forming apparatus, the dot size and the scanning speed are controlled on the basis of the resolution of the optical system which is mounted in the image forming apparatus.

In the conventional scanning type image forming apparatus, the writing clock signal and/or the scanning speed are controlled so that the dotting density is changed. However, since one clock of the writing clock signal corresponds to one pixel (dot), in the image forming apparatus in which the timing for supplying the image data to the scanning unit is controlled on the basis of the writing clock signal, when only the writing clock signal and/or the scanning speed are controlled to change the dotting density, the starting point and the width of the image which is formed in a main scanning direction are changed.

SUMMARY OF THE INVENTION

Accordingly, a general object of the present invention is to provide an image forming apparatus capable of changing a dotting density in which the disadvantage of the aforementioned prior art is eliminated.

A more specific object of the present invention is to provide an image forming apparatus capable of changing a dotting density in which the starting point and the width of the image which is formed in the main scanning direction can be constant even if the writing clock signal and/or the scanning speed are controlled to change the dotting density.

The above objects of the present invention are achieved by an image forming apparatus comprising: scanning means for scanning a recording medium in synchronism with a writing clock signal so that a dotted image is formed on the recording medium, the writing clock signal corresponding to an arrangement of dots in a dotted image which should be formed on the recording medium; counter means for carrying out a count operation in synchronism with the writing clock signal so that one or a plurality of count values determining a scanning area where the scanning means scans the recording medium are obtained; first control means for controlling the scanning means based on one count value or the plurality of count values obtained by the counter means so that the scanning means is activated or inactivated; specifying means for specifying a dotting density, the dotting density being the number of dots in a unit length in a dotted image which should be formed on the recording medium; second control means for controlling the frequency of the writing clock signal and/or a speed at which the scanning means scans the recording medium, based on the dotting density specified by the specifying means; and changing means, coupled to the counter means and the specifying means, for changing one count value or the plurality of count values, which should be obtained by the counter means, based on the dotting density specified by the specifying means, so that a position of the scanning area with respect to the recording medium is constant even if the frequency of the writing clock signal and/or the speed at which the scanning means scans the recording medium are changed by the second control means.

Additional objects, features and advantages of the present invention will become apparent from the following detailed description when read in conjunction with the accompanying drawings.

BRIEF DESCRIPTION OF THE DRAWINGS

FIG. 4 illustrates a relationship between an effective area formed on the photosensitive drum and the recording sheet;

FIG. 6 is a block diagram illustrating a first example of a circuit for generating a timing signal and the writing clock signal;

DESCRIPTION OF THE PREFERRED EMBODIMENTS

A description will now be give of a first embodiment of the present invention with reference to the accompanying drawings.

Figure 1:
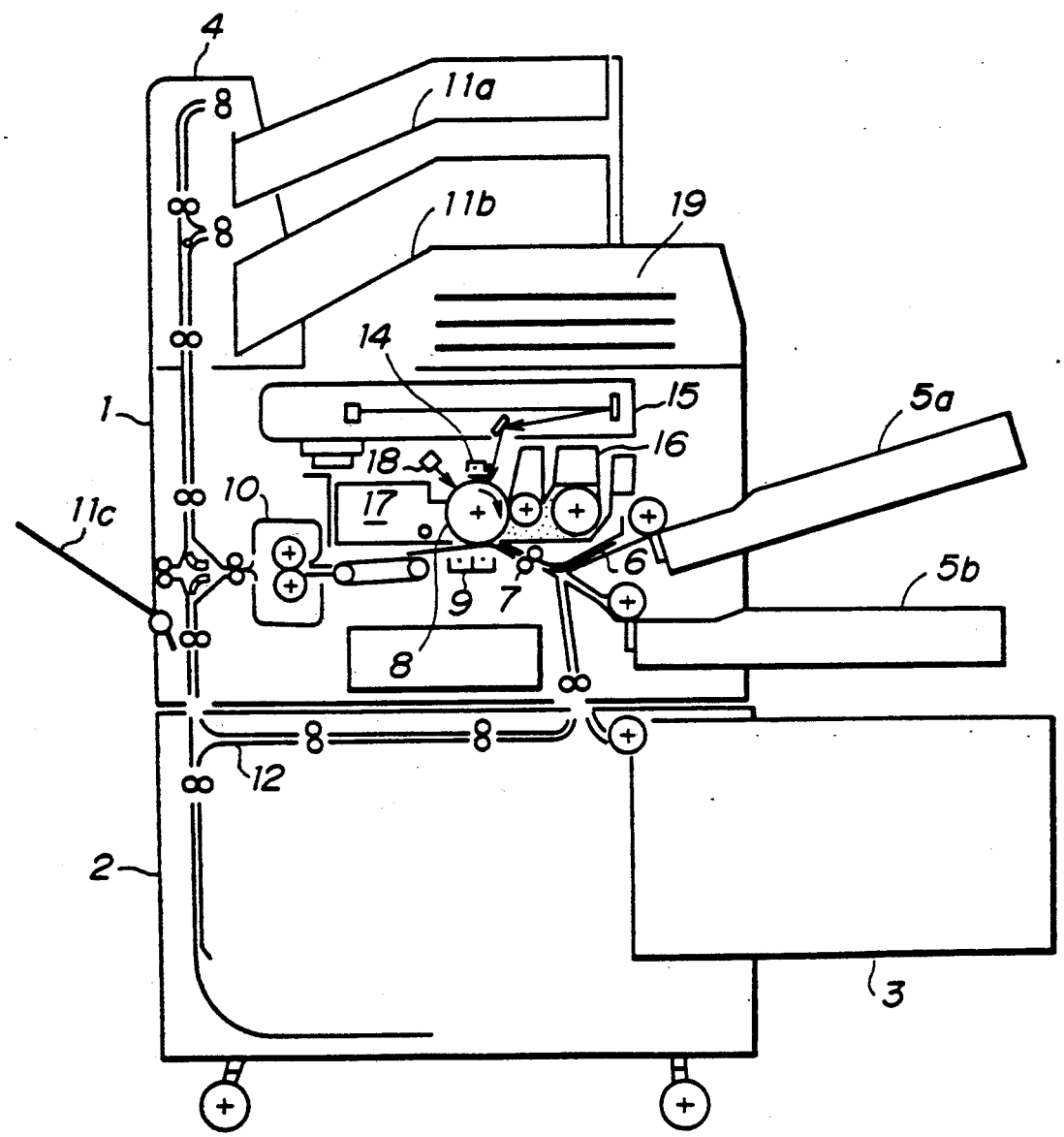
FIG. 1 is a diagram illustrating an internal mechanism of a laser beam printer according to the present invention.

FIG. 1 shows an internal mechanism of a laser beam printer. Referring to FIG. 1, the laser beam printer basically has a main printer body 1, a table 2, a large capacity paper supplying unit 3 and a large capacity paper ejecting unit 4. Paper supplying cassettes 5a and 5b are detachably mounted in the main printer body 1. A recording sheet 6 ejected from either paper supplying cassette 5a or 5b or the large capacity paper supplying unit 3 is transported up to registration rollers 7. The registration rollers 7 feed the recording sheet 6 toward a photosensitive drum 8 at a predetermined timing. A toner image which has been formed on the surface of the photosensitive drum 8 is transferred to the recording sheet 6 by a transferring and separating charger 9. The recording sheet having the toner image is fed to a fuser unit 10, and then the toner image is fixed on the recording sheet 6 by the fuser unit 10.

The recording sheet on which the toner image is fixed is ejected to either an ejecting tray 11a or 11b provided on the large capacity paper supplying unit 4 or a side ejecting tray 11c provided on the main printer body 1 in accordance with a operation mode which is specified. For example, when a duplex printing mode is specified, the image is formed on a first side of the recording sheet 6, and then the recording sheet 6 is reversed while the same is being transported through a duplex paper feed path 12. The recording sheets having the images formed on the first side thereof are stacked until the number of recording sheets becomes a predetermined value. Next, the recording sheets are refed to the main printing body 1 one by one, and then an image is formed on a second side of each recording sheet 6. The recording sheets having the images formed on both sides thereof are ejected to either ejecting tray 10a, 10b or 10c.

The photosensitive drum 8 is rotated in a direction indicated by an arrow by a main motor (not shown). The surface of the photosensitive drum 8 rotated by the main motor is charged by a charger unit 14, and then a laser beam emitted from a writing unit 15 scans the surface of the photosensitive drum 8. Thus, an electrostatic latent image is formed on the surface of the photosensitive drum 8. A developing unit 16 develops the electrostatic latent image so that the visible toner image corresponding to the electrostatic latent image is formed on the surface of the photosensitive drum 8. The toner image formed on the surface of the photosensitive drum 8 is transferred to the recording sheet 6, which is fed by the registration rollers 7 at a predetermined timing, by the transferring and separating charger 9, as described above.

After the toner image is transferred to the recording sheet 6, some toner particles usually remain on the surface of the photosensitive drum 8. The toner particles remaining on the surface of the photosensitive drum 8 are removed by a cleaning unit 17, and then any electrostatic charges remaining on the photosensitive drum 8 are discharged by exposure to an erasure lamp 18. Thus, the photosensitive drum 8 is then ready to be charged again by the charger 14 as the first step in the next copy cycle.

Printed circuit boards 19, on which circuits of a controller, an engine driver and so on are formed, are provided over the writing unit 15.

Figure 2:
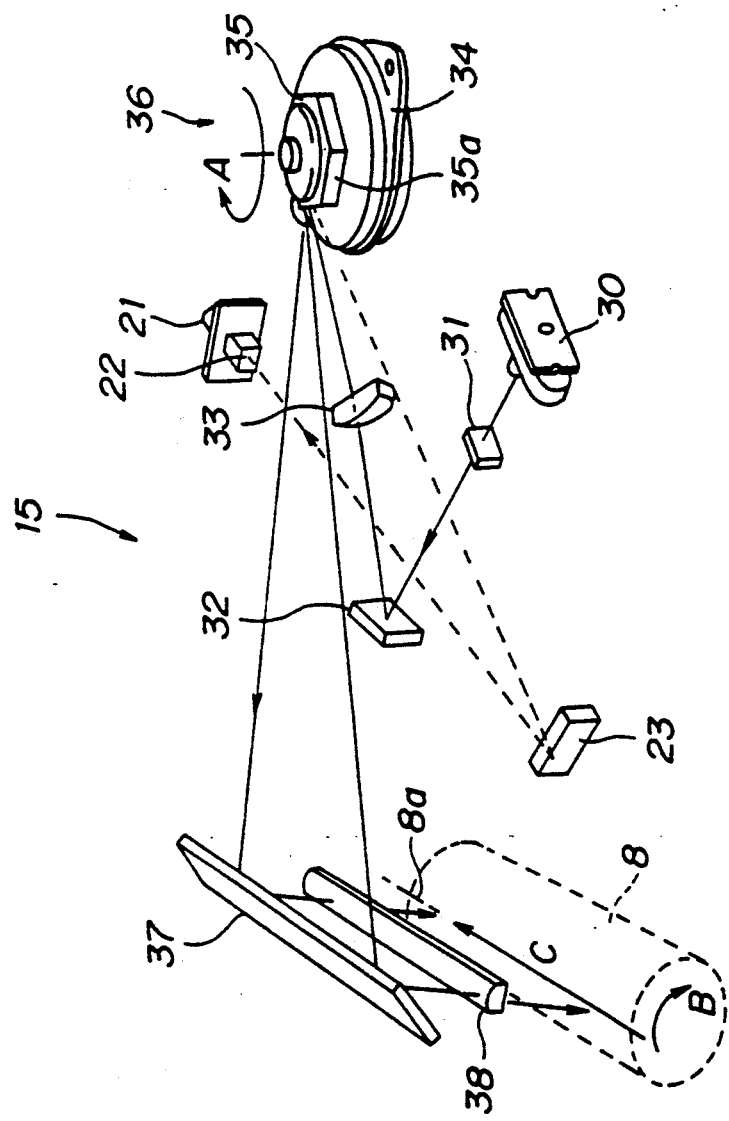
FIG. 2 is an exploded perspective view showing an example of a writing unit mounted in the laser printer shown in FIG. 1.

FIG. 2 shows an example of the writing unit.

Referring to FIG. 2, the writing unit 15 has a writing optical system and a synchronous optical system. The writing optical system includes an LD unit 30 having a laser diode (not shown) and a collimator lens, a variable aperture stop 31, a first mirror 32, a focusing lens 33, a rotating deflector 36, a second mirror 37 and a cylindrical lens 38 which extends in the main scanning direction. The LD unit 30 emits the laser beam which is collimated by the collimator lens. The variable aperture stop 31 controls the diameter of the laser beam spot. The focusing lens 33 focuses the laser beam reflected by the first mirror 32 on the surface of the photosensitive drum 8 so that a laser beam spot is formed thereon. The rotating deflector 36 has a disc type motor 34 and a polygonal mirror 35 which is provided on a shaft of the motor 34. The polygonal mirror 35 is rotated in a direction indicated by an arrow A by the motor 34. In this writing optical system, the focusing lens 33 is provided up stream of the rotating deflector 36. Thus, each of reflecting surfaces 35a of the polygonal mirror 35 is slightly curved so that a curved image which is generated by the focusing lens 33 is corrected and a scanning speed at which the laser beam scans a scanning line 8a on the photosensitive drum 8 becomes constant. That is, the writing optical system is a pre-object type optical system.

The synchronous optical system has a photo detector 21, a lens 22 and a third mirror 23. The photo detector 21 converts a light into a electrical signal and outputs a synchronous signal when the laser beam is incident on the photo detector 21. The lens 22 focuses the laser beam on the incident surface of the photo detector 21 so that the small laser beam spot is formed thereon.

The diameter of the laser beam spot collimated and emitted by the LD unit 30 is controlled by the variable aperture stop 31. Thus, when the diameter of the laser beam spot is large, the size of the laser beam spot formed on the photosensitive drum 8 is small. On the other hand, when the diameter of the laser beam spot is small, the size of the laser beam spot formed on the photosensitive drum 8 is large. The variable aperture stop 31 controls the diameter of the laser beam spot in accordance with the dotting density so that the size of the laser beam spot is changed into the optimum size.

The collimated laser beam passing through the variable aperture stop 31 is reflected by the first mirror 32, and changed into the focused beam by the focusing lens 33. Then, the focused laser beam is reflected by each reflecting surface 35a of the rotating deflector 36 so that the focused beam scans the surface of the photosensitive drum 8.

The laser beam is incident on the third mirror 23 immediately before the laser beam is incident on the photosensitive drum 8. The laser beam reflected by the third mirror 23 is focused on the incident surface of the photo detector 21 by the lens 22. The photo detector 21 outputs the synchronous signal having a sharp pulse shape. Then, the laser beam whose spot size is controlled by the variable aperture 31 scans the photosensitive drum 8 on the scanning line 8a in the direction indicated by a arrow C (the main scanning direction). As a result, a line electrostatic latent image is formed on the photosensitive drum 8. The photosensitive drum 8 is rotated in the direction indicated by the arrow B so that the line electrostatic latent images are repeatedly formed on the photosensitive drum 8. Hence, a two dimensional electrostatic latent image is formed on the cylindrical surface of the photosensitive drum 8.

Figure 3:
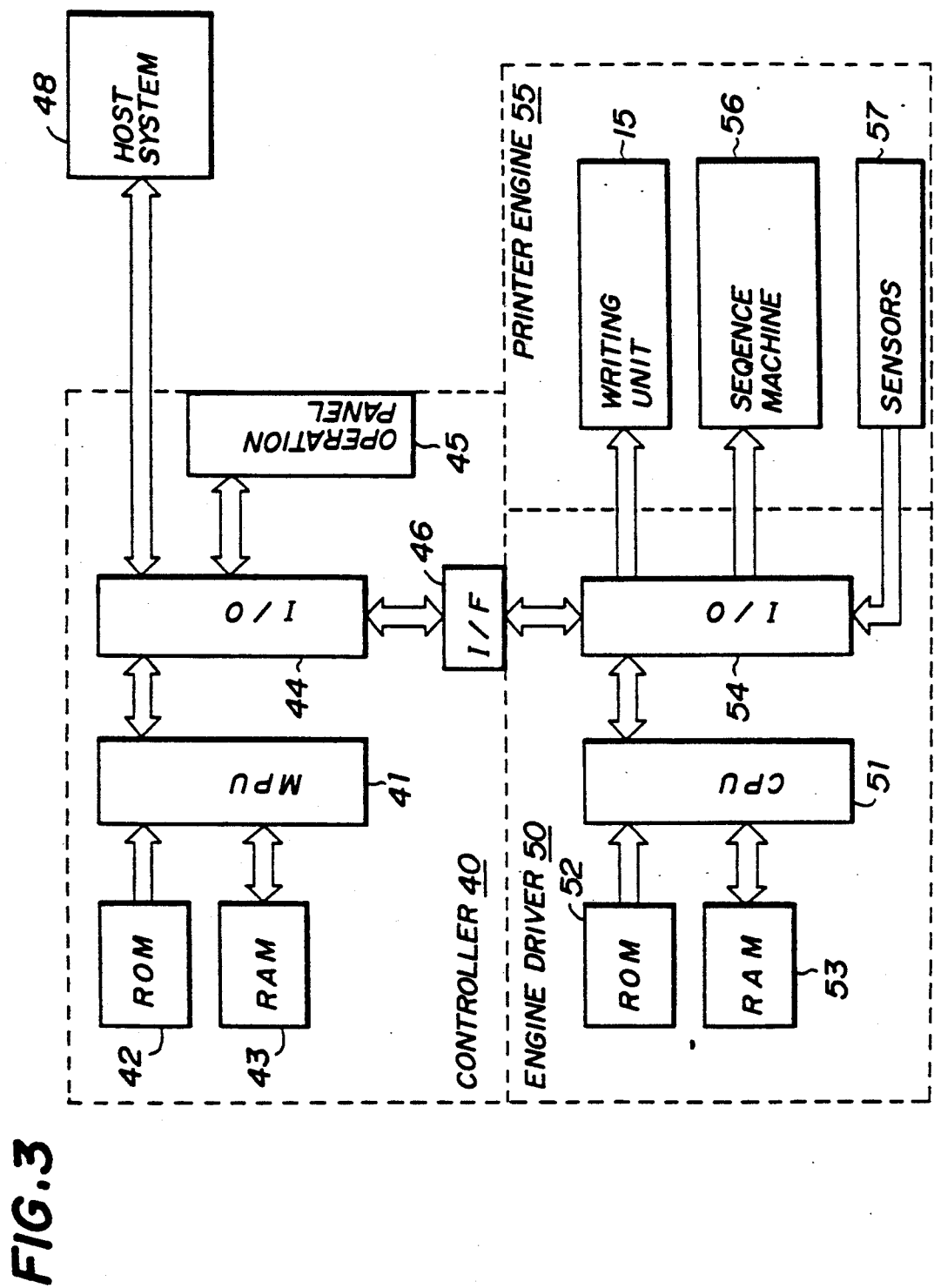
FIG. 3 is a block diagram illustrating an example of a control system of the laser beam printer shown in FIG. 1.

FIG. 3 is a block diagram illustrating an example of a control system of the laser beam printer described above.

Referring to FIG. 3, the control system has a controller 40 and a engine driver 50. The controller 40 includes a micro computer (MPU) 41, a read only memory (ROM) 42, a random access memory (RAM) 43, an input/output unit (I/O) 44, an operation panel 45 and an internal interface (I/F) 46. The ROM 42 stores programs, constant data, character fonts and the like which are used in the MPU 41. The RAM 43 stores data generated by the MPU 41, dot patterns and the like. The I/O 44 controls an input operation and an output operation with respect to the command and the data. The operation panel 45 is connected via the I/O 44 to the MPU 41. The MPU 41, the ROM 42, the RAM 43, the I/O 44, the operation panel 45 and the I/F 46 are connected to each other by a data bus, an address bus and the like. A host system 48 is connected to the MPU 41 of the controller 40 via the I/O 44. The host system 48 supplies a printing instruction, character data, image data and the like to the MPU 41.

The engine driver 50 includes a microcomputer (CPU) 51, a read only memory (ROM) 52, a random access memory (RAM) 53 and an input/output unit (I/O) 54 which are connected to each other by a data bus, an address bus and the like. The ROM 52 stores programs and constant data which are used in the CPU 51. The RAM 53 stores data which are calculated by the CPU 51. The I/O 54 controls a data input operation and a data output operation. The I/O 54 is connected to the I/F 46 of the controller 40. A video signal, operation signals based on the operation of the operation panel 45 and the like output from the controller 40 are supplied via the I/F 46 and the I/O 54 to the engine driver 50. The writing clock signal and status signals such as a paper end signal which indicates the tail end of the recording sheet output from the engine driver 50 are supplied via the I/O 54 and the I/F 46 to the controller 40. The I/O 54 of the engine driver 50 is also connected to a printer engine 55. The printer engine 55 includes the writing unit 15, a sequence machines 56 and various types of sensors 57 including the photo detector 21.

When the controller 40 receives the printing instruction, the character codes and the image data output from the host system 48, the controller 40 edits the character code and the image data. For example, the controller 40 changes the character codes into dot patterns on the basis of the character fonts stored in the ROM 42. The dot patterns of the characters and the image (hereinafter both are termed the image) are stored in a video RAM (VRAM) area of the RAM 43. When the engine driver 50 supplies a ready signal and the writing clock to the controller 40, the controller 40 changes the dot patterns stored in the VRAM area of the RAM 43 into a video signal in synchronism with the writing clock signal and then the video signal is supplied via I/F 46 to the engine driver 50.

The engine driver 50 controls the writing unit 15 and the sequence machines 56 on the basis of the data supplied from the controller 40. The engine driver 50 also supplies the video signal supplied from the controller 40 to the writing unit 15 and operates signals output from the various types of sensors 57, which signals indicate the states of various portions of the laser printer system. The engine driver 50 supplies information which is obtained from the sensors 57, an error signal and the like to the controller 40.

FIG. 4 shows an effective image area, with respect to the main scanning direction, where the latent image can be formed on the photosensitive drum 8 and sizes of various types of the recording sheets with respect to the main scanning direction. In FIG. 4, (A) shows the effective image area which is set on the photosensitive drum 8, (B) shows a synchronous detecting position where the photo detector 21 outputs the synchronous signal, (C) shows an area where a double letter sized (11 inches×17 inches) recording sheet (W-letter) is positioned, (D) shows an are where a letter sized (11 inches×8.5 inches) recording sheet and a legal sized recording sheet are respectively positioned and (E) shows an area where a A4 sized recording sheet is positioned. For example, the various types of the recording sheets are fed to the photosensitive drum 8 so that a center of each recording sheet is positioned at a center of the effective image area of the photosensitive drum 8, with respect to the main scanning direction, as shown in FIG. 4 (A) (C) (D) and (E).

Figure 5:
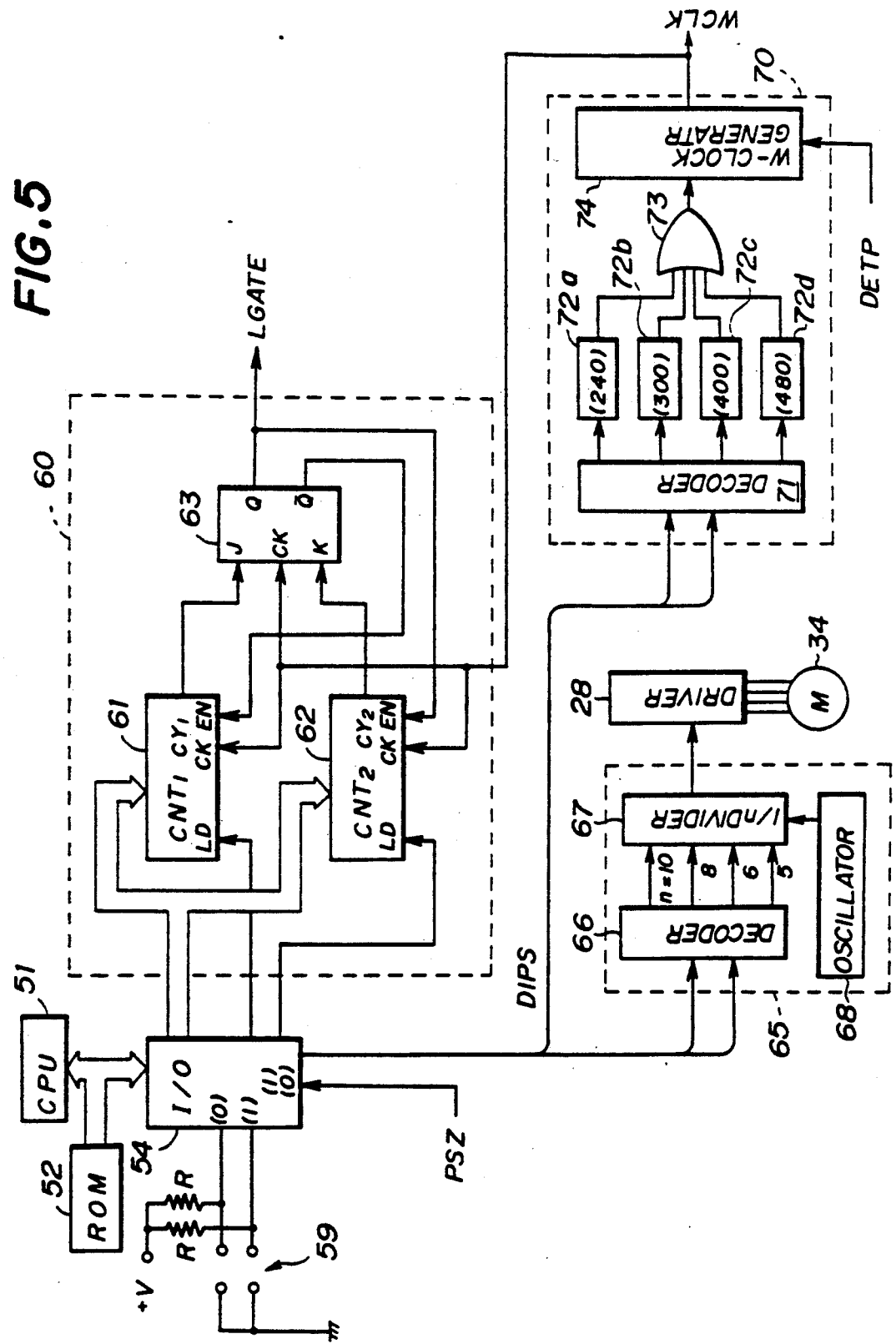
FIG. 5 is a timing chart illustrating a relationship among a synchronous signal DETP, a writing clock signal WCLK and a timing signal LGATE.

A distance between the synchronous detecting position (A) and the starting point of each recording sheet (the left side end of the area indicated by a solid line in FIG. 4) and a distance between the starting point of each recording sheet and an end point thereof (the right side end of the area indicated by the solid line in FIG. 5) are different from those of other types of recording sheets. In this laser printer system, an area of image which is formed on the photosensitive drum 8 is controlled by use of various timing signals (LSYNC, LGATE and the like) so that the image formed on the photosensitive drum 8 is in accord with each type of recording sheet. Each of the timing signals (LSYNC, LGATE and the like) are generated by counting the writing clock signal.

In addition, the position of the effective image areas of the photosensitive drum 8 vary thereon. Also, the recording sheets fed to the photosensitive drum 8 vary in position with respect to the photosensitive drum 8, as indicated by dotted lines in FIG. 4 (C) (D) and (D). The synchronous detecting positions vary due to errors in mounting the photo detector 21. These variations depend on only the laser beam printer system and are not changed on the basis of the temperature, the time elapsed, and the size of the recording sheet and the like. It is necessary to control the timing signals (LSYNC, LGATE and the like) in accordance with the variations regarding the effective image area, the position of the recording sheet with respect to the photosensitive drum 8, the synchronous detecting position and the like.

While the timing signal LGATE (hereinafter termed a LGATE) is active, the laser beam modulated in accordance with the video signal is emitted from the LD unit 30. FIG. 5 shows a part of the control system of the writing unit 15 connected to the engine driver 50. This part of the control system of the writing unit 15 include a circuit for generating the LGATE, a circuit for controlling the motor 34 of the rotating deflector 36 and a circuit for generating the writing clock signal WCLK (hereinafter termed a WCLK).

Referring to FIG. 5, the CPU 51, the ROM 52 and the I/O 54 which are included in the engine driver 50 are connected to each other by the data bus, the address bus and the like. Dip switches (hereinafter termed DSW) 59 are connected to two terminals (0) and (1) of the I/O 54. A LGATE generating circuit 60, a motor rotation control circuit 65 and a writing clock control circuit 70 are connected to the I/O 54. The LGATE generating circuit 60 has a starting point counter (CNT1) 61, a gate width counter (CNT2) 62 and a J-K flip flop 63. The motor rotation control circuit 65 has a decoder 66, a 1/n divider 67 and an oscillator 68. The motor rotation control circuit 65 supplies a control signal having a frequency corresponding to the rotation number of the motor 34 to a driver circuit 28. The driver circuit 28 drives the motor 34 based on the control signal supplied from the motor rotation control circuit 65. The writing clock control circuit 70 has a decoder 71, four clock oscillators 72a through 72d, an OR circuit 73 and a writing clock generating circuit 74.

A signal PSZ which indicates the size of the recording sheet is supplied from the controller 40 to the I/O 54. The signal PSZ (hereinafter termed a PSZ) has two bits and inputs to two terminals (0) and (1) of the I/O 54. The relationship between the PSZ and the sizes of the recording sheets are indicated in Table 1.

TABLE 1

| PSZ (1) | PSZ (0) | sheet code | sheet size |
|---|---|---|---|
| L | L | 0 | A4 |
| L | H | 2 | LETTER |
| H | L | 4 | LEGAL |
| H | H | 8 | W-LETTER | where H denotes a high level bit and L denotes a low level bit.

Each state of the DSW 59 indicates the dotting density, which is the number of pixels (dots) per inch (dpi). The relationship between the state of the DSW 59 and the dotting density is indicated in Table 2.

TABLE 2

| DSW (1) | DSW (0) | DPI code | dotting density (dpi) |
|---|---|---|---|
| L | L | 0 | 240 |
| L | H | 2 | 300 |
| H | L | 4 | 400 |
| H | H | 8 | 480 | where H denotes an OFF state of the DSW 59 and L denotes an ON state of the DSW 59.

The relationship indicated in Table 2 is stored in the ROM 52. Thus, in this laser beam printer system, the image having either the dotting density 240 dpi, 300 dpi, 400 dpi or 480 dpi can be formed. The CPU 51 determines the state of the DSW 59 on the basis of the levels of terminals (1) and (0) connected to the DSW 59. The CPU 51 refers to the relationship between the state of the DSW 59 and the dotting density which is stored in the ROM 52 and outputs a selection signal DPIS (hereinafter termed a DPIS). The DPIS corresponds to the dotting density (dpi) identified by the DSW 59. The DPIS is supplied to the decoder 66 of the motor rotation control circuit 65 and the decoder 71 of the writing signal control circuit 70.

In the motor rotation control circuit 65, the decoder 66 outputs a division rate data (n) corresponding to the dotting density. For example, when inputting each DPIS corresponding to each of the codes "0" "2" "4" and "8", the decoder 66 outputs a corresponding one of the division rate data (n) "10" "8" "6" and "5" (n=10, 8, 6 or 5). The division rate data (n) is supplied to the 1/n divider 67. The divider 67 divides a standard signal having a predetermined frequency, which signal is output from the oscillator 68, based on the division rate data (n). The control signal obtained by the dividing operation of the 1/n divider 67 is supplied to the driver 28 so that the motor 34 of the rotating deflector 36 is driven by the driver 28 at a speed corresponding to the dotting density identified by the DSW 59.

In the writing clock control circuit 70, the first oscillator 72a outputs a signal having a frequency corresponding to 240 dpi, the second oscillator 72b outputs a signal having a frequency corresponding to 300 dpi, the third oscillator 72c outputs a signal having a frequency corresponding to signal having a frequency corresponding to 480 dpi. The decoder 71 outputs a selector signal corresponding to the DPIS. That is, the selector signal activates the first oscillator 72a when the DPIS denotes the dotting density 240 dpi, the selector signal activates the second oscillator 72b when the DPIS denotes the dotting density 300 dpi, the selector signal activates the third oscillator 72c when the DPIS denotes the dotting density 400 dpi, and the selector signal activates the fourth oscillator 72d when the DPIS denotes the dotting density 480 dpi. The signals output from the oscillators 72a through 72d are supplied to the OR circuit 73 and an output signal of the OR circuit 73 is supplied to the writing clock generating circuit 74. The synchronous detecting signal DETP (hereinafter termed a DETP) is also supplied from the photo detector 21 via the I/O 54 to the writing clock generating circuit 74. The writing clock generating circuit 74 inputs the signal output from one of the oscillators 72a through 72d via the OR circuit 73 as a reference clock CLK. The writing clock generating circuit 74 generates a plurality of clock signals which have the same frequency as the reference clock CLK and phases slightly different from those of the reference clock CLK. When receiving the DETP, the writing clock generating circuit 74 selects one of the clock signals, whose phase is closest to that of the reference clock CLK, and outputs the selected clock signal as the writing clock WCLK (hereinafter termed a WCLK) in synchronism with the DETP.

In the LGATE generating circuit 60, initial data corresponding to the starting point of writing the image is set in the starting point counter 61 when a load signal (LD) is active. Initial data corresponding to the width of the image in the main scanning direction is set in the gate width counter 62 when a load signal (LD) is active. The starting point counter 61 and the gate width counter 62 count down one by one in synchronism with the WCLK starting from the initial data. When a value of each of the counters 61 and 62 becomes "0", an output of each of the counters 61 and 62 is active. The output of the starting point counter 61 is connected to a J-terminal of the J-K flip flop 63, and the output of the gate width counter 62 is connected to a K-terminal of the J-K flip flop 63. A non-inverted output terminal (Q) of the J-K flip flop 63 is connected to an enable terminal (EN) of the gate width counter 62 and a inverted output terminal ($\overline{Q}$) is connected to an enable terminal (EN) of the starting point counter 61. The signal output from the non-inverted terminal (Q) of the J-K flip flop 63 is the LGAT for activating the LD unit 30.

FIG. 6 shows a timing chart illustrating a relationship among the DETP, the WCLK and the LGATE. In FIG. 6, (A) indicates the DETP, (B) indicates the WCLK and (C) indicates the LGATE. A rising up point of the LGATE corresponds to a position from which the writing of an image starts, and a falling down point of the LGATE corresponds to a position at which the writing of the image is finished. That is, the width of the high level (H-level) of the LGATE corresponds to the width of the recording sheet, and the laser beam is modulated in accordance with the image data (video signal) while the LGATE has the high level.

A time from the rising of the DETP to the rising of the LGATE depends on $(T_1+T_2)$ $T_1$ is an individual value of the laser beam printer system and corresponds to a compensation value for compensating the variations of the position of the recording sheet, the effective image area and the like. $T_2$ corresponds to the width of the recording sheet supplied to the laser beam printer system. The initial data corresponding to $(T_1+T_2)$ is set in the starting point counter 61. The time of the high level of the LGATE depends on $T_3$ corresponding to the width of the recording sheet supplied to the laser beam printer system. The initial data corresponding to $T_3$ is set in the gate width counter 62.

$(T_1+T_2)$ and $T_3$ are respectively measured by counting the WCLK. Since the frequency of the WCLK varies in proportion to the dotting density, the count value corresponding to either $(T_1+T_2)$ or $T_3$ also varies in proportion to the dotting density. Therefore, each count value, corresponding to one of the dotting densities (240 dpi, 300 dpi, 400 dpi and 480 dpi), which count values should be set in the counters 61 and 62 as the initial data, has been previously stored in the ROM 52.

For example, the count values $C_1$ corresponding to $T_1$ are indicated in Table 3. Each of the count values $C_1$ is determined on the basis of the compensation value which is the individual value of the laser beam printer system and the dotting density.

TABLE 3

| COMPENSATION CODE | DOTTING DENSITY (DPI) | | | |
|---|---|---|---|---|
| | 240 | 300 | 400 | 480 |
| 0 | 0 | 0 | 0 | 0 |
| 1 | 14 | 17 | 23 | 27 |
| 2 | 28 | 34 | 46 | 54 |
| 3 | 42 | 51 | 69 | 81 |
| 4 | 56 | 68 | 92 | 108 |
| 5 | 70 | 85 | 115 | 135 |
| 6 | 84 | 102 | 138 | 162 |
| 7 | 98 | 119 | 161 | 189 |

In Table 3, the compensation code "0" denotes a case where there is no variation of the position of the recording sheet with respect to the effective image area formed on the photosensitive drum. The count values $C_1$ can also be determined so that the compensation code "4" corresponds to the case where there is no variation of the position of the recording sheet. In this case, each count value of the compensation code "4" is zero, each count value of the compensation codes "0" "1" "2" and "3" is a minus number and each count value of the compensation codes "5" "6" and "7" is a plus number.

For example, the count values $C_2$ corresponding to $T_2$ are indicated in Table 4, and the count values $C_3$ corresponding to $T_3$ are indicated in Table 5. Each of the count Values $C_2$ and $C_3$ is determined on the basis of the size of the recording sheet and the dotting density.

TABLE 4

| RECORDING SHEET | DOTTING DENSITY (DPI) | | | |
|---|---|---|---|---|
| | 240 | 300 | 400 | 480 |
| A4 | 388 | 485 | 647 | 776 |
| LETTER | 360 | 450 | 600 | 720 |
| LEGAL | 360 | 450 | 600 | 720 |
| W-LETTER | 60 | 75 | 100 | 120 |

TABLE 5

| RECORDING SHEET | DOTTING DENSITY (DPI) | | | |
|---|---|---|---|---|
| | 240 | 300 | 400 | 480 |
| A4 | 1984 | 2480 | 3307 | 3968 |
| LETTER | 2040 | 2550 | 3400 | 4080 |
| LEGAL | 2040 | 2550 | 3400 | 4080 |
| W-LETTER | 2640 | 3300 | 4400 | 5280 |

The count values $C_1$, $C_2$ and $C_3$ are respectively stored in the ROM 52 as shown in Tables 3, 4 and 5.

A description will now be given of a pre-processing of the printing in CPU 51 with reference to FIG. 7.

Figure 7:
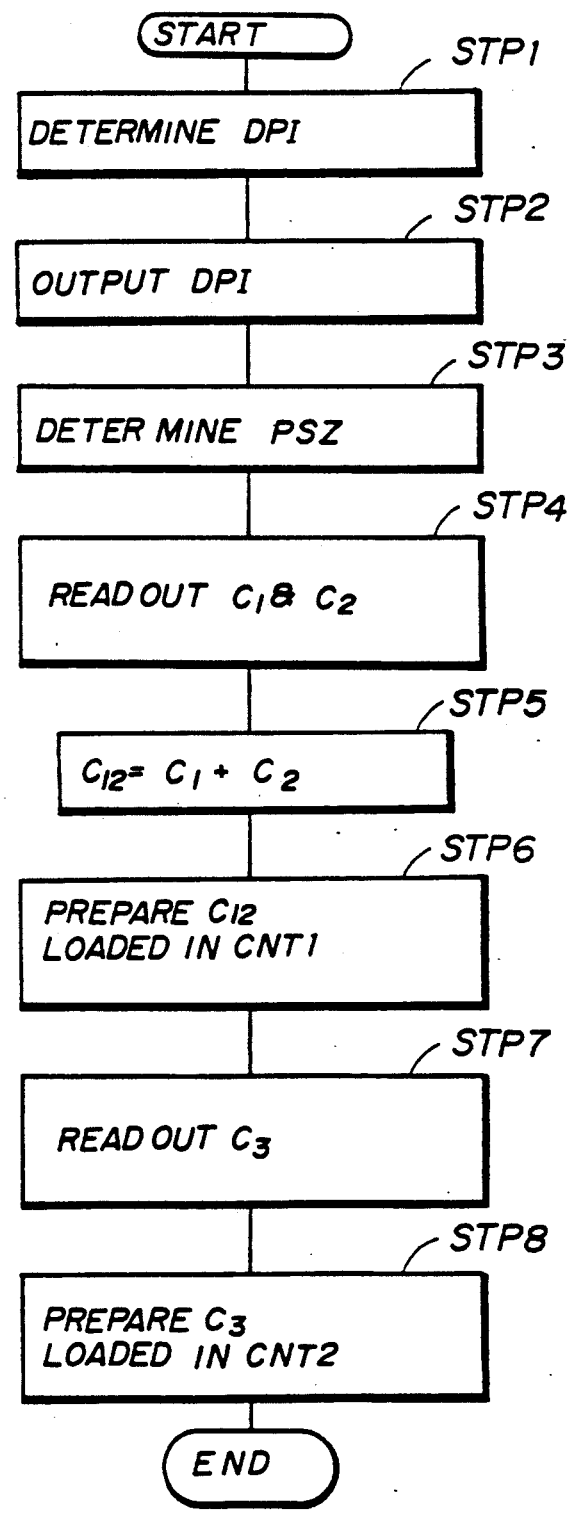
FIG. 7 is a flow chart illustrating a procedure for loading count values in counters.

Referring to FIG. 7, step STP1 determines what is the dotting density which is specified by a user on the basis of the states of the DSW 59, with reference to Table 1 stored in ROM 52. Then the DPIS corresponding to the specified dotting density is supplied to the motor rotation control circuit 65 and the writing clock control circuit 70, in step STP 2. Thus, in the motor rotation control circuit 65, the control signal having a frequency corresponding to the specified dotting density is determined. In the writing clock control circuit 70, one of the oscillators 72a through 72d corresponding to the specified dotting density is selected. Next, step STP3 determines the size of the recording sheet which should be supplied to the main printer body 1 on the basis of the data PSZ which is supplied from either the host system 48 or the operation panel 45. Then, step 4 reads out the count value $C_1$ corresponding to the compensation code set in this laser beam printer system and the specified dotting density from Table 3 stored in the ROM 52. Step 4 reads out the count value $C_2$ corresponding to the size of the recording sheet determined in step 3 and the specified dotting density from Table 4 stored in ROM 52. Step 5 calculates a count value $C_{12}$ in accordance with a formula $(C_{12}=C_1+C_2)$. The count value $C_{12}$ corresponds to $(T_1+T_2)$ shown in FIG. 6. Then, in step 6, the count value $C_{12}$ is loaded in the starting point counter 61 of the LGATE generating circuit 60 in synchronism with a load signal (LD) via the data bus.

Thereafter, step STP 7 reads out the count value $C_3$ corresponding to the size of the recording sheet and the specified dotting density from Table 5 stored in ROM 52. Then, in step 8, the count value $C_3$ is loaded in the gate width counter 62 in synchronism with a load signal (LD) via the data bus. When step 8 is completed, the pre-processing of the printing is finished.

After the pre-processing of the printing described above, when the printing instruction and the image codes are supplied from the host system 48 to the controller 40, the controller 40 converts the image codes into the image data and edits the image data so that a bit map is formed in the VRAM area of the RAM 43. Then, the controller 40 supplies a printing instruction to the CPU 51 of the engine driver 50, so that the motor rotation control circuit 65 outputs the control signal and the driver 28 drives the motor 34 based on the control signal. The motor 34 of the rotating deflector 36 is rotated at a rotational frequency corresponding to the specified dotting density.

When the controller 40 supplies a signal indicating that the bit map has been already formed in the VRAM area of the RAM 43 and the image data can be output to the CPU 51, the CPU 51 starts an image writing cycle in which the laser beam scans the photosensitive drum 8 so that a line image is formed.

In the image writing cycle, first, the count value $C_{12}$ (=$C_1+C_2$) is loaded, as the initial data, in the starting point counter 61, and the count value $C_3$ is loaded, as the initial data, in the gate width counter 62, so that both the output CY1 of the starting point counter 61 and the output CY2 of the gate width counter 62 have low levels (L-level). That is, low level signals supplied to both the J-terminal and the K-terminal of the J-K flip flop 63 are maintained at the low level. Thus, the J-K flip flop 63 is in a state of being clear so that the non-inverted terminal (Q) has a low level and the inverted terminal ($\overline{Q}$) has a high level. In this case, the starting point counter 61 is enabled and the gate width counter 62 is disenabled. The non-inverted terminal (Q) of the J-K flip flop 63 has the low level, so that the LGATE also has the low level.

When the DETP is supplied from the photo detector 21 to the writing clock control circuit 70, the writing clock control circuit 70 outputs the WCLK having a frequency corresponding to the specified dotting density. The WCKL is supplied from the writing clock control circuit 70 to the respective clock terminal CLK of each counter 61 and 62 and the J-K flip flop 63. The starting point counter 61 which is enabled counts down starting from the count value $C_{12}$ (=$C_1+C_2$) in synchronism with the WCLK. When this occurs, there is no operation in the gate width counter 62 and the J-K flip flop 63.

When the starting point counter 61 is counting down and the value in the starting point counter 61 is up to "0", the state of the output CY1 thereof changes to the high level. That is, the state of the J-terminal of the J-K flip flop 63 changes to the high level, so that the state of the non-inverted terminal (Q) of the J-K flip flop 63 is changed to the high level and the state of the inverted terminal ($\overline{Q}$) thereof changes into the low level when the WCLK rises up. That is, the LGATE rises up to the high level. When this occurs, the start point counter 61 becomes being disenabled and the gate width counter 62 becomes being enabled. Then the gate width counter 62 counts down starting from the count value $C_3$ in synchronism with the WCLK.

When the gate width counter 62 is counting down and the value in the gate width counter 62 is up to "0", the state of the output CY2 thereof changes into the high level. That is, the state of the K-terminal of the J-K flip flop 63 changes to the high level, so that the state of the non-inverted terminal (Q) of the J-K flip flop 63 returns to the low level and the state of the inverted terminal ($\overline{Q}$) thereof returns to the high level when the WCLK rises up. That is, the LGATE falls down to the low level.

Figure 8:
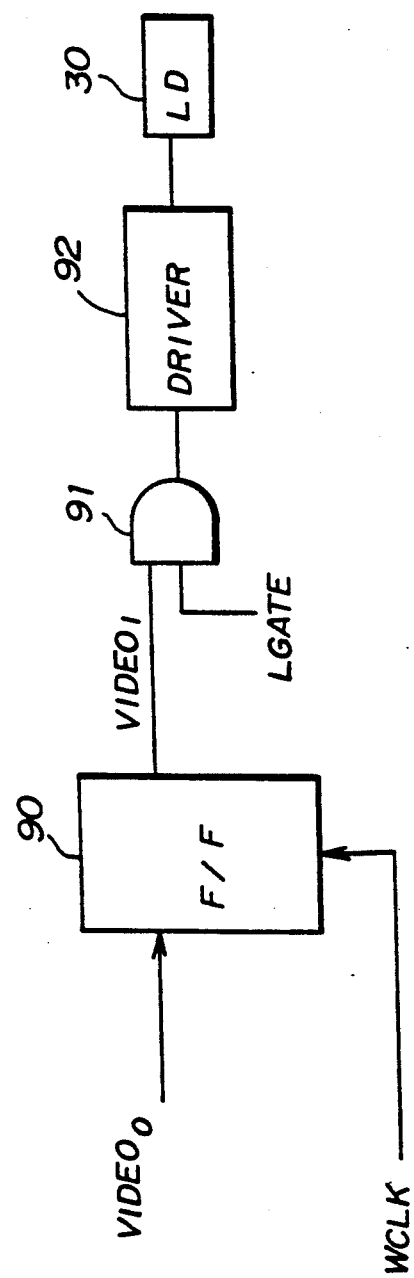
FIG. 8 is a block diagram illustrating a circuit for driving an LD unit.

The writing unit 15 also has a driving control circuit shown in FIG. 8. In FIG. 8, the driving control circuit receives the video signal $VIDEO_0$ supplied from the controller 40, the WCLK supplied from the writing clock control circuit 70, and the LGATE supplied from the LGATE generating circuit 60. The $VIDEO_0$ is supplied to a flip flop 90 which operates in synchronism with the WCLK so that the flip flop 90 outputs a clocked video signal $VIDEO_1$. The clocked video signal $VIDEO_1$ is supplied to an AND gate 91 which is controlled on the basis of the LGATE. An output signal from the AND gate 91 is supplied to a driver 92. The driver 92 drives the LD unit 30 on the basis of the signal supplied from the AND gate 91. That is, while the LGATE is a high level, the clocked video signal $VIDEO_1$ is supplied via the AND gate 91 to the driver 92, and then the driver 92 drives the LD 30 in accordance with the clocked video signal $VIDEO_1$ so that the leaser beam emitted from the LD unit 30 is modulated in accordance with the clocked video signal $VIDEO_1$. Then the modulated laser beam emitted from the LD unit 30 scans the surface of the photosensitive drum 8, so that the latent image for one line is formed on the photosensitive drum 8.

When the LGATE becomes the low level, the writing clock control circuit stops outputting the WCLK, so that the image writing cycle for one line is finished.

Next, immediately before the DETP is supplied to the writing clock control circuit, the count values are loaded in the counters 61 and 62, and then the image writing cycle for the next line starts. The image writing cycle is repeated until the the image for one page having a plurality of lines is formed on the recording sheet.

According to the first embodiment described above, the count value $c_1$ for compensating the relative variation of the position of the recording sheet with respect to the effective image area formed on the photosensitive drum 8 is changed in accordance with the dotting density. The count value $c_2$ for determining the starting position of a line image and the count value $c_3$ for determining the width of the line image are also changed in accordance with the dotting density. The writing clock WCLK is counted and thus the timing signal LGATE determined by the count values $c_1$, $c_2$ and $c_3$ is obtained. Therefore, the area where the laser beam emitted from the LD unit 30 activated by the LGATE scans in a main scanning direction is constant even if the scanning speed and/or the frequency of the WCLK are changed to change the dotting density.

A description will now be given of a second embodiment of the present invention with reference to FIGS. 9A, 9B 10 and 11.

Figure 9A:
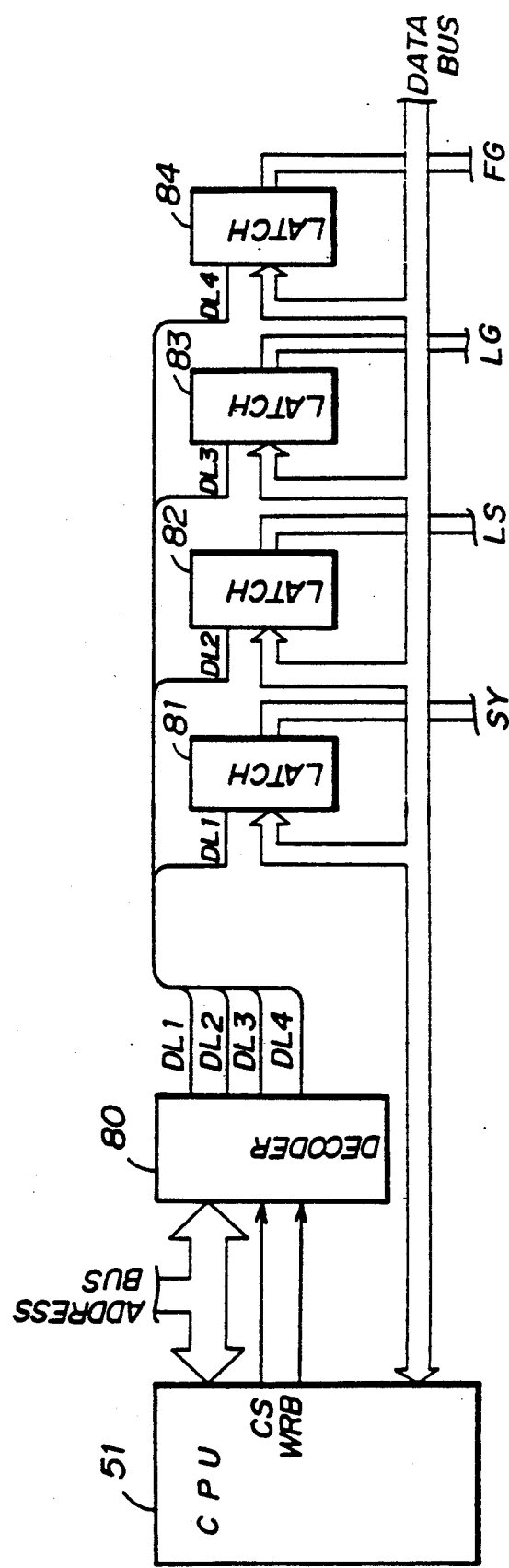
FIGS. 9A and 9B are block diagrams illustrating a second example of a circuit for generating timing signals.
Figure 9B:
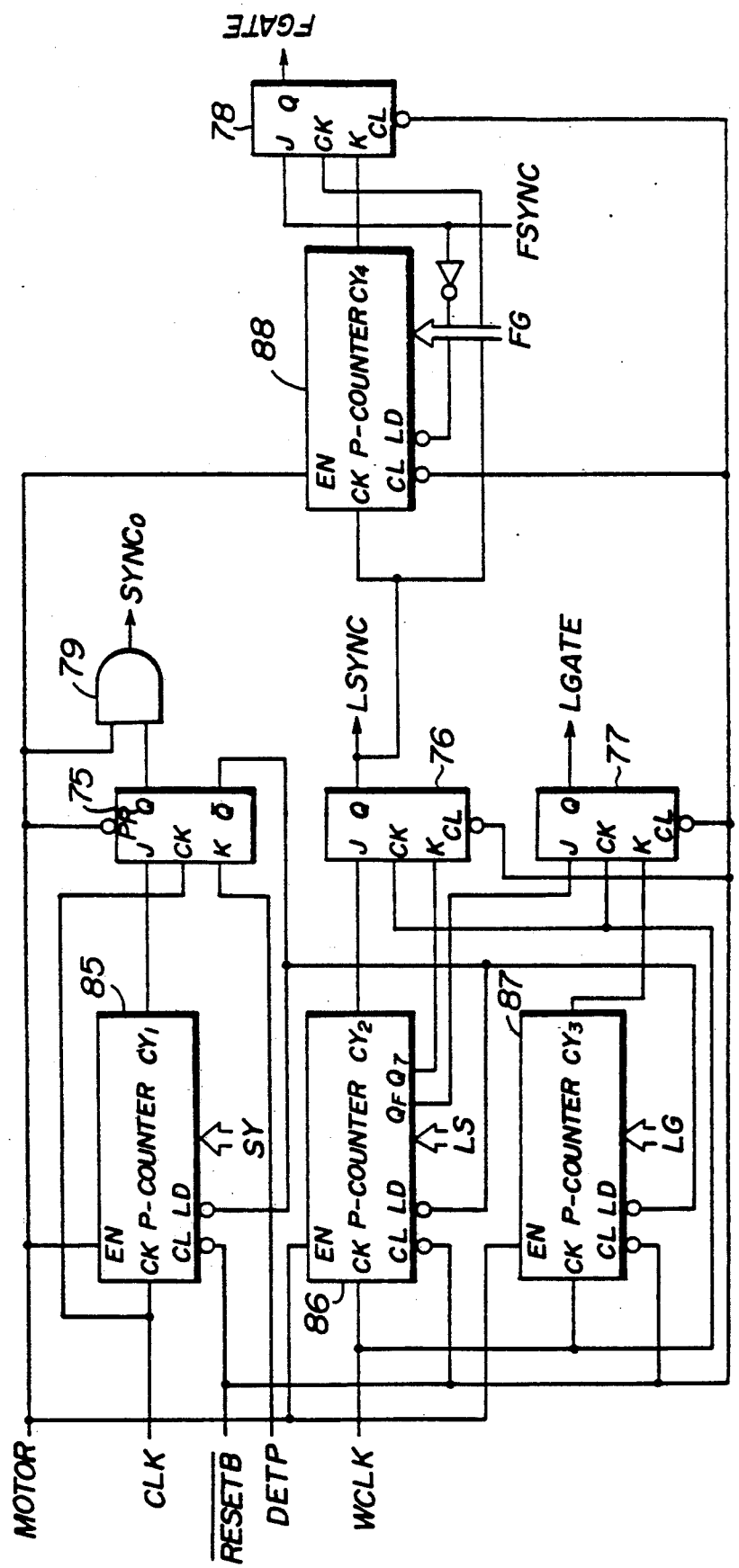

FIGS. 9A and 9B are circuit diagrams illustrating a control circuit for generating timing signals which are denoted by $SYNC_0$, LSYNC, FGATE and LGATE. The $SYNC_0$ is a timing signal for determining a time during which the DETP should be active. The $SYNC_0$ becomes high immediately before the laser beam emitted from the LD unit 30 is incident to the photo detector 21. The $SYNC_0$ falls down to a low level after the photo detector 21 outputs the DETP. That is, the LD unit 30 emits the laser beam while the $SYNC_0$ is high. The LSYNC is a timing signal which is activated before the LGATE rises to a high level. In the second embodiment, the LSYNC rises to a high level 16 clocks before the LGATE rises to the high level, and the high level of the LSYNC is maintained for 8 clocks of the WCLK. The FGATE is a timing signal which has a high level from the start of the scanning for one page to an end thereof.

The control circuit shown in FIGS. 9A and 9B has a decoder 80, four latch circuits 81 through 84, four counters 85 through 88, four J-K flip flops 75 through 78 and an AND circuit 79. Each of the counters 85 through 88 is a programable counter.

First, referring to FIG. 9A, the CPU 51 in the engine driver 50 supplies a chip select signal CS to the decoder 80 and outputs predetermined data to a data bus. The CPU 51 supplies a write strobe signal WRB to the decoder 80 after outputting the predetermined data. The decoder 80 decodes the chip select signal CS and activates either signal DL1, DL2, DL3 or DL4 to select either the latch circuit 81, 82, 83 or 84. Then the decoder 80 supplies the write strobe signal WRB to the selected latch circuit. The selected latch circuit latches a data supplied via the data bus from the CPU 51 and outputs the latched data. The data supplied from the CPU 51 includes four count numbers SY, LS, LG and FG. The count number SY corresponds to a time at which the timing signal $SYNC_0$ is low, and is latched in the latch circuit 81. The count number LS corresponds to a time from the a rising of the DETP to the rising of the LGATE, and is latched in the latch circuit 82. The count value LG corresponds to a time from the rising of the DETP to the falling down of the LGATE, and is latched in the latch circuit 83. The count number FG corresponds to the width of the FGATE, and is latched in the latch circuit 84. The count numbers SY, LS, LG and FG are supplied, as initial data, from the latch circuits 81 through 84 to the counters 85 through 88 shown in FIG. 9B. That is, the count number SY is supplied to the counter 85, the count number LS is supplied to the counter 86, the count number LG is supplied to the counter 87 and the count number FG is supplied to the counter 88. Each of the count numbers SY, LS, LG and FG is changed on the basis of the dotting density specified by the DSW 59. The count number LS corresponds to each count value C2 indicated in Table 4. The count number LG corresponds to a sum (C2+C3) of each count value C2 and a corresponding one of the count values C3 indicated in Table 5. The count number FG corresponds to each count value C4 indicated in Table 6. The count value C4 is determined on the basis of the dotting density and the length of the recording sheet in the direction of the transporting thereof.

TABLE 6

| RECORDING SHEET | DOTTING DENSITY (DPI) | | | |
|---|---|---|---|---|
| | 240 | 300 | 400 | 480 |
| A4 | 2806 | 3508 | 4677 | 5613 |
| LETTER | 2640 | 3300 | 4400 | 5280 |
| LEGAL | 3360 | 4200 | 5600 | 6720 |
| W-LETTER | 4080 | 5100 | 6800 | 8160 |

Next, referring to FIG. 9B, each of the counters 85 through 88 is enabled when the motor 34 of the rotating deflector 36 is driven. The counter counts up one by one starting from the count number SY in synchronism with a predetermined reference clock signal CLK. Each of the counters 86 and 87 counts up one by one staring from a corresponding count number, which is loaded therein, in synchronism with the WCLK. The counter 88 counts up one by one starting from the count number FG in synchronism with the LSYNC output from the J-K flip flop 76. Each of the counters 85, 86, 87 and 88 is a cycle counter in which a carry signal CY is activated when the count value thereof becomes the maximum value all of whose bits are "1". Therefore, CPU 51 reads out the count values C1–C4 from the ROM 52, and changes a corresponding count value (or the sum of the count values) to a complement. The complement is supplied, as each count number SY, LS, LG and FG, to a corresponding latch circuit (81, 82, 83, 84). The counter 85 is coupled to the J-K flip flop 75, the counter 86 is coupled to the J-K flip flop 76, the counter 87 is coupled to the J-K flip flop 77 and the counter 88 is coupled to the J-K flip flop 78.

Figure 10:
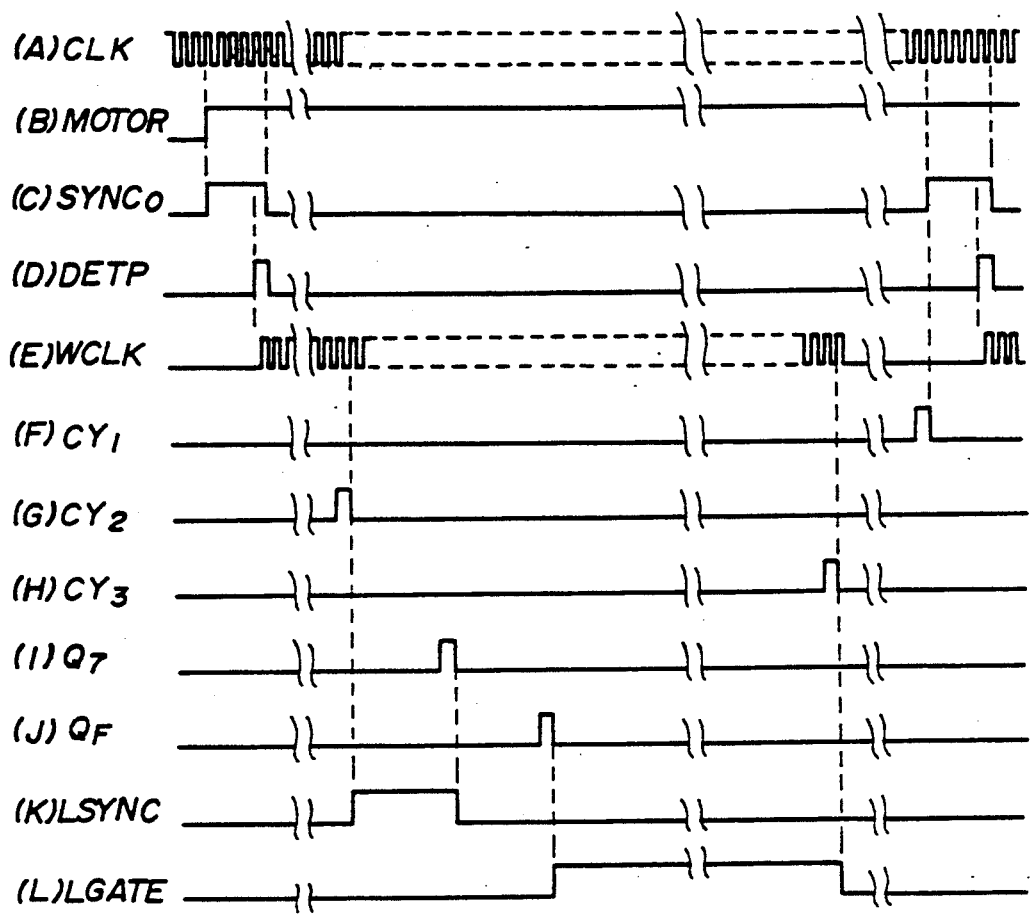
FIGS. 10 and 11 are timing charts illustrating a state of each signal generated in the circuit shown in FIGS. 9A and 9B.
Figure 11:
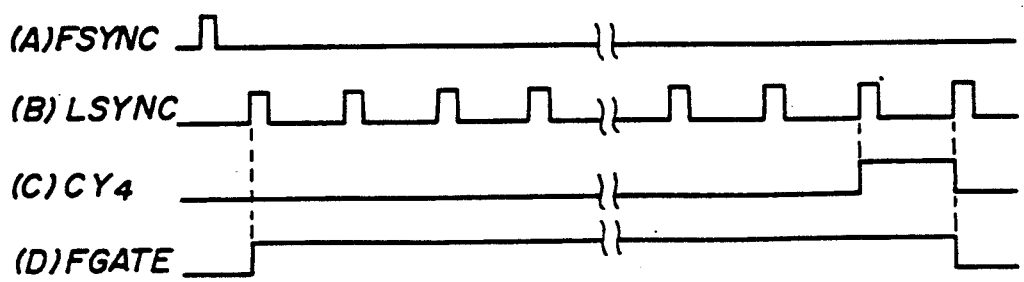

FIGS. 10 and 11 show timing charts illustrating various signals which are generated in the circuit shown in FIGS. 9A and 9B.

In FIG. 10, (A) indicates a reference clock CLK, (B) through (D) respectively indicate a motor signal MOTOR, the $SYNC_0$ and the DETP, (E) indicates the writing clock WCLK, and (F) through (H) respectively indicate carry signals CY1 of the counter 85, CY2 of the counter 86 and CY3 of the counter 87. (I) in FIG. 10 indicates a first sub-carry Q7 which is activated when the count value in the counter 86 becomes "7" and (J) indicates a second sub-carry QF which is activated when the count value in the counter 86 becomes "15". (K) and (L) in FIG. 10 respectively indicate the LSYNC and the LGATE. In FIG. 11, (A) and (B) respectively indicate a timing signal FSYNC and the LSYNC, (C) indicates a carry signal CY4 output from the counter 88 and (D) indicates the FGATE. A time scale in FIG. 11 is shorter than that in FIG. 10.

A description will now be given of an operation of the circuit shown in FIGS. 9A and 9B with reference to FIGS. 10 and 11.

Each of the counters 85 through 88 is cleared by a reset signal $\overline{RESETB}$ when a power supply is turned on, and is enabled while the motor signal MOTOR is high (H). The motor signal MOTOR is used for driving the motor 34 and so on. The J-K flip flop 75 is preset when the motor signal MOTOR is low (L), and maintains the reset state where the non-inverted terminal Q thereof is maintained at the high level and the inverted terminal $\overline{Q}$ is maintained at the low level even if the motor signal MOTOR returns to high (H). Thus, when the $SYNC_0$ output from the AND circuit 79 becomes high (H), the motor signal MOTOR becomes high (H), so that the laser beam is emitted from the LD unit 30. Since the inverted terminal $\overline{Q}$ of the J-K flip flop 75 is low (L), each of the counter number SY, LS and LG is loaded in a corresponding one of the counters 85, 86 and 87. When this occurs, each of the carry signals CY1, CY2, and CY3 of the respective counters 85, 86 and 87 is maintained at the low level (L). On the other hand, the count number FG is loaded in the counter 88 when the pulse signal FSYNC, which is output from the CPU 51 at a print starting time, is high. Then the counter 88 starts the counting operation when the FSYNC returns to the low level (L). The counter 85 and the J-K flip flop 75 respectively operate in synchronism with the reference clock signal CLK without regard to the WCLK.

And now, the laser beam which is emitted from the LD unit 30 based on the high level (H) of the $SYNC_0$ is incident on the photo detector 21, so that the photo detector 21 outputs the DETP. When the DEPT having the high level is supplied to the K-terminal of the J-K flip flop 75, the output signal from the non-inverted terminal Q of the J-K flip flop 75 is inverted to the low level. As a result, the $SYNC_0$ output from the AND circuit 79 falls down to the low level, so that the LD unit 30 stops emitting the laser beam. At this time, the output signal from the inverted terminal $\overline{Q}$ of the J-K flip flop 75 becomes high (H), so that each of the counters 85, 86 and 87 is changed to a state where the count number cannot be loaded therein and starts counting up one by one.

Then, the count value in the counter 86 amounts to the maximum value 16 clocks before starting to form the line image. When the count value in the counter 86 amounts to the maximum value, the counter 86 outputs the carry signal CY2 having the high level and the count value in the counter 86 returns to "0". When the carry signal CY2 having the high level is supplied to the J-terminal of the J-K flip flop 76, the LSYNC output from the non-inverted terminal Q of the J-K flip flop 76 becomes high and is supplied to the counter 88, J-K flip flop 78 and the controller 40.

The counter 86 counts up one by one starting from "0" in synchronism with the WCLK. When the count value in the counter 86 amounts to "7", the first sub-carry Q7 having the high level is supplied from the counter 86 to the K-terminal of the J-K flip flop 76. Thus, the LSYNC output from the non-inverted terminal Q of the J-K flip flop is maintained at the high level for 8 clocks of the WCLK.

Furthermore, when the count value in the counter 86 amounts to "15", the second sub-carry QF having the high level is supplied from the counter 86 to the J terminal of the J-K flip flop 77. Thus, the LGATE output from the non-inverted terminal Q of the J-K flip flop 77 becomes high. That is, the LGATE rises up after 8 clocks from a time at which the LSYNC falls down. Then, when the LGATE becomes high, the WCLK is supplied to the controller 40 and the image data is output from the controller 40 in synchronism with the WCLK. The laser beam which is modulated on the basis of the image data is emitted from the LD unit 30 and scans on the surface of the photosensitive drum 8.

When the scanning of the laser beam for one line is completed, the count value in the counter 87 amounts to the maximum value, and the counter 87 supplies the carry signal CY3 having the high level to the K-terminal of the J-K flip flop 77. When this occurs, the LGATE output from the non-inverted terminal Q of the J-K flip flop 77 returns to low. Then the WCLK is stopped and the one line image is completely formed.

The counter 85 counts up one by one in synchronism with the reference signal CLK starting from a time when the DETP becomes high. The count value in the counter 85 amounts to the maximum value immediately before the DETP becomes high again. Then the counter 85 supplies the carry signal CY1 having the high level to the J-terminal of the J-K flip flop 75, so that the $SYNC_0$ based on the output signal from the non-inverted terminal Q of the J-K flip flop 75 becomes high. The $SYNC_0$ is maintained at the high level until the DETP becomes high.

The operation described above is repeatedly carried out while the FGATE is high, so that the line images (latent images) are sequentially formed on the photosensitive drum 8. When the FSYNC is high, the count number FG is loaded in the counter 88. The counter 88 starts counting when the FSYNC returns to low. Then the counter 88 counts up starting from the count number FG in synchronism with the LSYNC supplied from the J-K flip flop 76. When the count value in the counter 88 amounts to the maximum value, the counter 88 supplies the carry signal CY4 having the high level to the K-terminal of the J-K flip flop 78. Thus, the FGATE output from the non-inverted terminal Q of the J-K flip flop 78 returns to low. When the FGATE returns to low, the image forming for one page is completed.

According to the second embodiment described above, it is possible to control the timing signal LGATE which determines the write starting point of the line image and the width of the line image, the timing signal $SYNC_0$ which is used for activating the LD unit 30 to detect the synchronous signal DETP, and the timing signal FGATE which determines a length of an image for one page in the sub scanning direction, in accordance with the dotting density.

In addition, it is also possible to compensate the relative variation between the recording sheet and the effective area formed on the photosensitive drum 8, in the same manner as the first embodiment. In this case, $(C_1+C_2)$ is substituted for $C_2$ and $(C_1+C_2+C_3)$ is substituted for $(C_2+C_3)$. Thus, the complement of the $(C_1+C_2)$ is latched in the latch circuit 82 and the complement of the $(C_1+C_2+C_3)$ is latched in the latch circuit 83.

In the present invention, the dotting density and the size of the recording sheet are not limited to those described in the above embodiments. That is, there can be many combinations of the dotting densities and the sizes of the recording sheet. But, as the count value corresponding to each combination of the dotting density and the size of the recording sheet is stored in the ROM 52 and is supplied from the ROM 52 to a corresponding counter, the structure of the circuit for generating the timing signals is prevented from becoming complex even if the combinations of the dotting densities and the sizes of the recording sheet increase.

In the printer in which a laser writing unit for emitting the laser beam modulated on the basis of the image data can be exchanged for a new one, it is possible to control the timing signals for writing an image on the basis of the dotting density corresponding to the laser writing unit which is mounted in the printer. In a case where the dotting density of the laser writing unit is not identical to any of the densities indicated in the Tables which show the relationships among the dotting densities, the size of the recording sheet and the count values for generating the timing signals, it is possible to calculate the count value corresponding to the density of the laser writing unit based on the count values indicated in the Tables.

According to the present invention, as described above, the starting point and the width of the line image which is formed in the main scanning direction can be constant even if the frequency of the writing clock signal and/or the scanning speed are controlled to change the dotting density.

The present invention is not limited to the aforementioned embodiments, and variations and modifications may be made without departing from the scope of the claimed invention.

What is claimed is:

1. An image forming apparatus comprising:
   scanning means for scanning a recording medium in synchronism with a writing clock signal so that a dotted image is formed on the recording medium, said writing clock signal corresponding to an arrangement of dots in a dotted image which should be formed on the recording medium;
   counter means for carrying out a count operation in synchronism with the writing clock signal so that one count value or a plurality of count values for determining a scanning area where said scanning means scans the recording medium are obtained;
   first control means for controlling said scanning means based on said one or said plurality of count values obtained by said counter means so that said scanning means is activated or inactivated;
   specifying means for specifying a dotting density, said dotting density being the number of dots in a unit length in a dotted image which should be formed on the recording medium;
   second control means for controlling the frequency of the writing clock signal and/or a speed at which said scanning means scans the recording medium, based on the dotting density specified by said specifying means; and
   changing means, coupled to said counter means and said specifying means, for changing said one count value or said plurality of count values, which should be obtained by said counter means, based on the dotting density specified by said specifying means, so that a position of the scanning area with respect to said recording medium is constant even if the frequency of the writing clock signal and/or the speed at which said scanning means scans the recording medium are changed by said second control means.

2. An image forming apparatus as claimed in claim 1, wherein said changing means has determining means for determining one count value or a plurality of count value corresponding to the dotted density specified by said specifying means, based on the scanning area where said scanning means should scan the recording medium, and supplying means for supplying said one count value or said plurality of count values determined by said determining means to said counter means, and wherein said counter means carries out the count operation so that said one count value or the plurality of count values supplied from said supplying means are obtained.

3. An image forming apparatus as claimed in claim 2, wherein said determining means has storage means for storing a table indicating one count value or a plurality of count values corresponding to each predetermined dotting density, and wherein said determining means determines said one count value or said plurality of count values corresponding to the dotting density specified by said specifying means with reference to said table stored in said storage means.

4. An image forming apparatus as claimed in claim 1, wherein said one count value or said plurality of count values include a first count value corresponding to a time at which said scanning means starts to scan the recording medium, and wherein said counter means carries out the count operation so that the first count value is obtained and said first control means activates said scanning means when the first count value is obtained.

5. An image forming apparatus as claimed in claim 4, wherein said changing means comprises storage means for storing a first table indicating the first count value corresponding to each predetermined dotting density, and first means for determining the first count value corresponding to the dotting density specified by said specifying means with reference to said first table stored in said storage means and for supplying the first count value to said counter means, and wherein said counter means carries out the count operation so that the first count value is obtained and said first control means activates said scanning means when the first count value is obtained.

6. An image forming apparatus as claimed in claim 4, wherein said one count value or said plurality of count values further includes a second count value corresponding to a time at which said scanning means stops scanning the recording medium, and wherein said counter means carries out the count operation so that the first and second count values are obtained and first control means activates said scanning means when the first count value is obtained and inactivates said scanning means when the second count value is obtained.

7. An image forming apparatus as claimed in claim 6, wherein said changing means has storage means for storing a first table indicating the first count value corresponding to each predetermined dotting density and a second table indicating the second count value corresponding to each predetermined dotting density, and first means for determining the first count value corresponding to the dotting density specified by said specifying means with reference to said first table stored in said storage means and for supplying the first count value to said counter means, and second means for determining the second count value corresponding to the dotting density specified by said specifying means with reference to said second table stored in said storage means and for supplying the second count value to said counter means, and wherein said counter means carries out the count operation so that the first and second count values are obtained and said first control means activates said scanning means when the first count value is obtained and inactivates said scanning means when the second count value is obtained.

8. An image forming apparatus as claimed in claim 1, wherein the recording medium comprises a first medium and a second medium, said second medium being fed to said first medium by a feeding means, and wherein said scanning means scans said first medium so that a dotted image is formed on said first medium and the dotted image is transferred from said first medium to said second medium.

9. An image forming apparatus as claimed in claim 8, wherein said one count value or said plurality of count values include a first count value corresponding to a time at which said scanning means starts to scan said first medium, and wherein said counter means carries out the count operation so that the first count value is obtained and said first control means activates said scanning means when the first count value is obtained.

10. An image forming apparatus as claimed in claim 9, wherein said first count value is determined based on a third count value corresponding to the size of said second medium in a direction in which said scanning means scans said first medium and a fourth count value corresponding to a relative position of said second medium with respect to said first medium, said fourth count value being inherent in said image forming apparatus.

11. An image forming apparatus as claimed in claim 10, wherein said changing means has a storage means for storing a third table indicating the third count value corresponding to each predetermined dotting density and a fourth table indicating the fourth count value corresponding to each predetermined dotting density, and determining means for determining the first count value based on the third and fourth count values corresponding to the dotting density specified by said specifying means with reference to the third and the fourth tables stored in said storage means, and wherein the first count value is supplied to said counter means.

12. An image forming apparatus as claimed in claim 9, wherein said one count value or said plurality of count values further include a second count value corresponding to a time at which said scanning means stops to scan said first medium, and wherein said counter means carries out the count operation so that the first and second count values are obtained and said first control means activates said scanning means when the first count value is obtained and inactivates said scanning means when the second count value is obtained.

13. An image forming apparatus as claimed in claim 12, wherein said second count value is determined based on a fifth count value corresponding to the size of said second medium in a direction in which said scanning means scans said first medium and said fourth count value.

14. An image forming apparatus as claimed in claim 13, wherein said changing means has a storage means for storing a third table indicating the third count value corresponding to each predetermined dotting density, a fourth table indicating the fourth count value corresponding to each predetermined dotting density and a fifth table indicating the fifth count value corresponding to each predetermined dotting density, first determining means for determining the first count value based on the third and fourth count values corresponding to the dotting density specified by said specifying means with reference to the third and the fourth tables stored in said storage means, and second determining means for determining the second count value based on the fourth and fifth count values corresponding to the dotting density specified by said specifying means with reference to the fourth and fifth tables stored in said storage means, and wherein the first and second count values are supplied to said counter means.

15. An image forming apparatus as claimed in claim 8, wherein said feeding means can feed different sized second mediums to said first medium, said changing means changes said one count value or said plurality of count values, which should be obtained by said counter means, based on the dotting density specified by said specifying means and the size of the second medium fed by said feeding means.

* * * * *